United States Patent [19]

Law

[11] 4,372,830
[45] Feb. 8, 1983

[54] RECOVERY OF GOLD IN GOLD PLATING PROCESSES

[75] Inventor: Henry H. Law, Berkeley Heights, N.J.

[73] Assignee: Bell Telephone Laboratories, Incorporated, Murray Hill, N.J.

[21] Appl. No.: 359,285

[22] Filed: Mar. 18, 1982

[51] Int. Cl.³ .............................................. C25R 1/20
[52] U.S. Cl. ................................... 204/110; 204/109; 210/674; 210/684; 423/24; 423/364; 75/107; 75/109; 75/101 BE
[58] Field of Search ................ 210/684, 674; 204/109, 204/110; 75/107, 109, 101 BE; 423/24, 364

[56] References Cited

U.S. PATENT DOCUMENTS

| | | | |
|---|---|---|---|
| 2,648,601 | 8/1953 | Byler et al. | 210/684 |
| 2,753,258 | 7/1956 | Burstall et al. | 210/684 |
| 3,582,269 | 6/1971 | Keith et al. | 423/364 |
| 3,656,893 | 4/1972 | Sloan | 423/24 |

FOREIGN PATENT DOCUMENTS

| | | | |
|---|---|---|---|
| 586375 | 11/1959 | Canada | 204/110 |
| 654821 | 12/1962 | Canada | 204/110 |

*Primary Examiner*—R. L. Andrews
*Attorney, Agent, or Firm*—Walter G. Nilsen

[57] ABSTRACT

A process is described involving gold in which gold cyanide ion (e.g., potassium gold cyanide) is removed from an aqueous solution (typically a water rinse solution) by absorption on an anion-exchange resin and the gold cyanide ion is then removed from the resin using an eluent solution comprising organic solvent, water and thiocyanate ion. This procedure is convenient and leads to virtually complete removal of gold from the resin. Because of the low volume of eluent solution required to remove the gold cyanide ion, the procedure can be used to efficiently produce crystalline potassium gold cyanide from highly dilute aqueous solutions.

15 Claims, 2 Drawing Figures

RECOVERY OF GOLD IN GOLD PLATING PROCESSES

TECHNICAL FIELD

The invention involves recovery of gold from resins used to remove gold from various solutions including rinse solutions.

BACKGROUND OF THE INVENTION

Gold is extensively used in industrial applications both for decorative purposes and in more utilitarian application. Gold is often used both in solid form and in the form of thin surface films in jewelry such as watches, rings, pins, chains, etc. Gold is also used extensively in electrical devices as a contact metal, electrical conduction paths and sometimes as a heat sink material.

Gold is often applied to surfaces by chemical means such a electroplating, electroless plating, displacement plating, etc. Such processes require that the gold be in the form of an ion soluble in a solvent such as water; often in the form of a cyanide complex ion such as $Au(CN)_2^-$. In such procedures, gold plating solution is rinsed from the piece being plated. The resulting rinse water contains gold in a highly diluted state. Recovery of this gold is highly advantageous economically.

Much of the interest in this particular area arises because of the increasing use and importance of gold in the electronics industry and the high and variable price of gold. For example, in some gold electroplating processes, extremely high rates are used and large amounts of product are electroplated per unit time. Such a process is described in a number of references including, U.S. Pat. No. 4,153,523 issued to D. E. Koontz and D. R. Turner on May 8, 1979; U.S. Pat. No. 4,230,538 issued to D. R. Turner on Oct. 28, 1980 and U.S. Pat. No. 4,278,520 issued to D. R. Turner on July 4, 1981. Particularly significant in these references is the large amount of rinse water used to remove gold plating solution from the articles being gold plated.

A particularly efficient procedure for removing a soluble gold in aqueous solutions such as rinse water, spent plating baths, drag-out solutions, etc., is the use of exchange resins. Typically, the soluble gold is in the form of potassium gold cyanide and this compound is absorbed on an anion-exchange resin. To recover the gold, the resin is often dried and then incinerated. The incineration method often resulted in losses of precious metals and loss of the exchange resin. It is highly desirable to have a procedure which would lead to recovery of essentially all of the gold and be non-destructive to the resin. Also, incineration of the resin leads to pollution problems which are desirable to avoid. An extractive process for removing gold from resins is described by F. H. Burstall et al in *Industrial and Engineering Chemistry*, Vol. 45, page 1648 (1953).

SUMMARY OF THE INVENTION

The invention is a process involving the use of gold cyanide ion (principally alkali-metal gold cyanide such as potassium gold cyanide) in which the gold cyanide ion is recovered from aqueous solution by use of an anion-exchange resin and the gold cyanide ion is extracted from the resin with a special extracting solution or eluent. This eluent comprises organic-water solution of thiocyanate ions. The eluent contains at least 5 weight percent water and at least 5 weight percent organic liquid. The range of concentration of thiocyanate ion is from 0.1 molar to saturation with the range from 1 to 5 molar preferred. Below 1 molar, less gold is extracted per unit volume of eluent and more than 5 molar yields no added advantages and often leads to inconvenient precipitation of thiocyanate salts. Such an extraction procedure leads to essentially 100 percent recovery of the gold from the resin.

DETAILED DESCRIPTION

1. The Eluent Solvent

Figure 1:
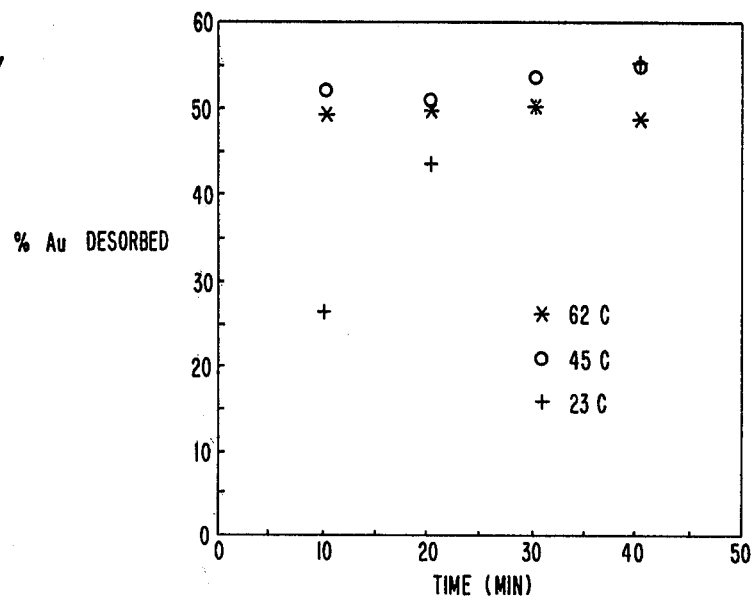
FIG. 1 shows a graph of data on amount of gold (as potassium gold cyanide) removed from the resin per unit time for several different temperatures.

The invention is largely based on the discovery that a mixture of organic solvent and water enhances the separation of gold cyanide ions from anion-exchange resins. The range of concentration for organic solvent is from 5 to 95 weight percent of the water. More preferred is from 25 to 75 weight percent with 50 ($\pm 10$) weight percent most preferred. The preferred concentrations are based on maximum separation of gold cyanide ion from the resin. It should be remarked that high separation (or minimum volume of eluent per unit weight of gold cyanide ion separated) is highly desirable in a separation process because it greatly increases the efficiency of the process.

The nature of the organic solvent is also of significance in the separation procedure. Although polar organic solvents are generally preferred because of high solubility in water, less polar solvents are also useful in the practice of the invention. Stability, especially in an aqueous solution, and non-volatility are preferred for convenience under manufacturing conditions.

Typical organic solvents useful in the practice of the invention are formamide, dimethylformamide, dimethylsulfoxide, dimethylacetamide, N-methyl-2-pyrrolidone, acetonitrile, acetone, tetrahydrofuran, diethylacetamide, diethylformamide, triethylphosphate, trimethylphosphate, tributylphosphate, dimethoxyethane ethylamine, ethylenediamine, triethylamine, propylene carbonate, dioxane, pyridine and dioxolane.

The preferred organic solvents are dimethylformamide, dimethylacetamide, acetone, N-methyl-2-pyrrolidone, dimethylsulfoxide and tetrahydrofuran. These organic solvents are stable, not very volatile and reasonably soluble in water. In addition, when used in the eluent, they yield high separation factors in extracting gold cyanide ion from anion-exchange resins. Particularly preferred is a 50 ($\pm 10$) weight percent mixture of dimethylformamide in water.

2. The Thiocyanate Ion

Thiocyanate ion is also present in the eluent to enhance separation of gold cyanide from the resin. The thiocyanate ion is added in a variety of ways including as an alkali-metal thiocyanate salt or ammonium thiocyanate.

One procedure of incorporating thiocyanate ion is the addition of $NH_4SCN$ and a base. In an article by Vitkovskaya et al, 2.44 molar $NH_4SCN$ and 0.61 molar NaOH was described. Particularly convenient is the use of KSCN, usually in the concentration range from 1 molar to saturation with 5 molar ($\pm 1$) most preferred.

The most preferred eluent comprises 5 molar KSCN in 50 weight percent dimethylformamide in water.

Ammonium thiocyanate is used in the eluent when gold is to be recovered in the form of ammonium gold cyanide. This compound is useful in various applications including replenishing gold plating baths. A particular advantage of ammonium gold cyanide as a replenishing agent is that ions do not build up in concentration in the solution since the ammonium hydroxide formed is decomposed as ammonia gas and water.

3. The Anion-Exchange Resin

A variety of anion-exchange resins are useful in the practice of the invention provides the resin absorbs gold cyanide ion. Generally, the most useful resin for removal of gold cyanide ion from aqueous solution (especially complete removal from dilute solution) is the strongly basic anion-exchange resins of the quaternary ammonium functionality. These anion-exchange resins have functional groups which may be represented by Res—$NR_3^+OH^-$ where Res is the resin structure and R is an aliphatic or aryl-aliphatic radical.

A variety of structural types may be used for the resin. A useful variety of resins have a porous gelular resin bead structure based on a styrene-divinylbenzene copolymer structure. Typical is a resin with polyvinyl-benzyl trimethyl ammonium hydroxide cross-linked with divinylbenzene. Such a resin is available as Amberlite® IRA-400 from Rohm and Haas Company. Also useful are resins designated as IRA-400C, 401S, 402, 410, 420C and 430. Other structural units in the resin may also be useful such as an acrylic-divinylbenzene copolymer available commercially as Amberlite® IRA-458. Other strongly basic anion exchanges are also useful such as those designated as IRA-900, 900C, 904, 910, 938 and 958 by the Rohm and Haas Company. Various ion-exchange resins are discussed in an article by D. C. Kennedy in *Chemical Engineering*, June 16, 1980, pp. 106-118.

4. Process Involving Gold Cyanide Ion

The invention involves recovery of gold from anion-exchange resins. Such resins are used generally to recover gold (in the form of gold cyanide ion) in highly dilute aqueous solutions such as rinse solutions in gold electroplating processes but may also be used for recovering gold from used electroplating solutions or various electroless and auto-catalytic gold plating solutions. A typical electroless procedure is described in U.S. Pat. No. 3,700,469, issued to Y. Okinaka on Oct. 24, 1972.

It should be understood that gold is primarily recovered but that other metals might be recovered along with the gold. For example, other metals including noble metals, copper, silver, nickel, cobalt, etc., might be contained in the gold as impurities, alloying agents, etc., and some of these metals might be recovered along with the gold.

For the most part, the procedure is used as part of a gold electroplating procedure. A variety of procedures and electroplating solutions are useful in the practice of the invention. Generally, the source of gold is potassium gold cyanide but other sources of gold cyanide ion $[Au(CN)_2^-]$ may be used such as sodium gold cyanide, ammonium gold cyanide, etc. Other sources of gold may also be useful where gold is in the form of a complexed anion.

Typical gold plating baths useful in the practice of the invention are given below. In each case, gold is in the form of potassium gold cyanide and recovery of gold from resins used to remove gold from rinse water or used baths would involve extraction of potassium gold cyanide from anion-exchange resins.

1. Hard Gold

Potassium gold cyanide $KAu(CN)_2$: 12-46 gm/l
Citric acid anhydrous: 80-120 gm/l
KOH: 4-6 gm/l
Cobalt citrate: 100-200 ppm 2. Hard Gold Potassium gold cyanide: 12-46 gm/l
Phosphoric acid to adjust pH to approximately 4.2
Cobalt citrate: 100-200 ppm 3. Soft Gold Potassium gold cyanide: 12-46 gm/l
Potassium hydrogen phosphate: 20-50 gm/l
Potassium dihydrogen phosphate: 5-15 gm/l
This yields a solution with pH approximately 7.0 and plating should be carried out at a temperature of approximately 65 degrees C. The pH is adjusted by the addition of phosphoric acid or potassium hydroxide. Generally, the pH is increased (to approximately 10) to avoid surface corrosion.

4. Soft Gold

Potassium gold cyanide: 10-45 gm/l
$(NH_4)_2HC_6H_5O_7$: 20-60 gm/l
pH 5-6.5 plating temperature approximately 65 degrees C.

5. Additive-Free Hard Gold

Potassium gold cyanide: 20-50 gm/l
Potassium dihydrogen phosphate: 100 gm/l
KOH to a pH of about 7.

In many respects, the gold plating process is conventional. Where electroplating is used, current is passed through an anode, electroplating solution and cathode. Electroplating takes place on the cathode. After electroplating, the piece being plated is often rinsed with rinse water before use or further processing. The rinse water contains gold generally in high dilution. Recovery of the gold is accomplished by absorption onto an anion-exchange resin which is subsequently processed in accordance with the invention. Electroless plated pieces are also rinsed in the same way and gold contained in the rinse water removed with the resin. Further, gold is also recovered from electroless plating solutions that are no longer useful for plating.

In addition, the process can be used to regenerate gold electroplating baths which have acquired excess impurities or excess ions. The spent bath is put through a resin column to absorb gold cyanide ion on the resin and the gold cyanide ion removed with eluent solution. The alkali-metal or ammonium gold cyanide can be used in a new bath solution or the gold isolated by standard procedures.

Desorption experiments were carried out with many solvents and conditions. Preferred because of its high rate of desorption is 4.88 molar KSCN is 50 weight percent dimethylformamide in water. The results are summarized in FIG. 1. Here, the percentage desorption is plotted as a function of time at various temperatures. As can be seen from FIG. 1, about 50-60 percent of the gold is desorbed after about 40 minutes at any temperature, but elevating the temperature of the eluent increases the rate at which the gold cyanide ion desorbs into the eluent solution. Naturally, this is an equilibrium experiment and complete removal of gold cyanide ion from the resin is achieved by supplying more eluent solution or removing gold cyanide ion (usually in the form of potassium gold cyanide) from the eluent solution.

Figure 2:
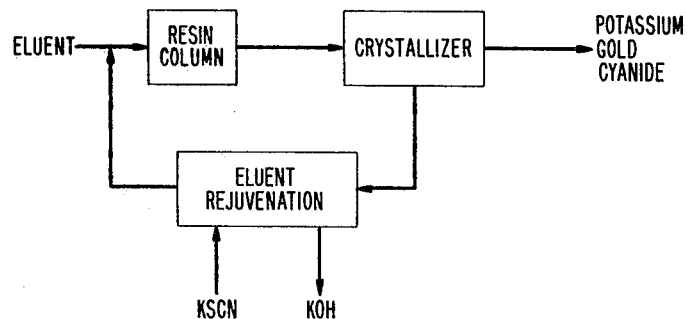
FIG. 2 shows an idealized flow diagram for the process of recovering potassium gold cyanide from resins.

Various types of chemical processes may be used to remove the potassium gold cyanide and recover the gold in a form convenient for use. A flow diagram for a typical process is shown in FIG. 2. Eluent is introduced into the resin column. Usually, the eluent is heated for two reasons. First, it ensures rapid equilibrium of the potassium gold cyanide between resin and eluent. Second, it provides a convenient way to remove potassium gold cyanide as described below. A temperature between 40 and 80 degrees C. is convenient. After going through the resin column, the eluent is cooled (generally to less than 40 degrees C., often to below room temperature or even close to 0 degrees C.) to remove the potassium gold cyanide. The potassium gold cyanide is usually washed and can be used again in the gold plating bath. The eluent is rejuvenated by adding thiocyanate ion (usually in the form of KSCN) and removing KOH. The KOH can be removed in a number of ways including electrodialysis and Donnan dialysis. This procedure provides a convenient procedure for recovering gold cyanide ion from resins and is highly advantageous economically.

The gold cyanide ion recovered from the eluent may be added to a gold plating bath to replenish the gold. Also, the eluent with the gold cyanide ion may under appropriate conditions be added to a gold plating bath (either electroplating bath or electroless bath).

Another procedure for recovering gold is to use an electroplating process to remove the gold from the eluent. This procedure is well known and yields gold electroplated on the cathode. In another procedure, the gold in the gold cyanide ion is reduced using a suitable reducing agent such as zinc. The gold is then separated from the eluent by a convenient means such as filtration.

What is claimed is:

1. A process involving the use of gold in the form of gold cyanide ion dissolved in aqueous solution where gold cyanide ion is recovered from at least a portion of the aqueous solution by absorption on an anion-exchange resin and the gold is removed from the resin using an eluent characterized in that the eluent comprises at least 0.1 molar thiocyanate ion, 5–95 weight percent organic solvent and water and the organic solvent consists essentially of at least one organic compound selected from the group consisting of formamide, dimethylformamide, dimethylsulfoxide, dimethylacetamide, N-methyl-2-pyrrolidone, acetonitrile, acetone, tetrahydrofuran, diethylacetamide, diethylformamide, triethylphosphate, trimethylphosphate, tributylphosphate, dimethoxyethane, ethylamine, ethylenediamine, triethylamine, propylene carbonate, dioxane, pyridine and dioxolane.

2. The process of claim 1 in which the concentration of thiocyanate ion ranges from 1 to 5 molar.

3. The process of claim 2 in which the thiocyanate ion is in the form of alkali-metal thiocyanate.

4. The process of claim 3 in which the alkali-metal thiocyanate is potassium thiocyanate.

5. The process of claim 1 in which the weight percent of organic solvent in the eluent ranges from 25 to 75.

6. The process of claim 1 in which the organic solvent consists essentially of at least one organic compound selected from the group consisting of dimethylformamide, dimethylacetamide, acetone, N-methyl-2-pyrrolidone, dimethylsulfoxide and tetrahydrofuran.

7. The process of claim 6 in which the organic solvent consists essentially of dimethylformamide.

8. The process of claim 7 in which the concentration of dimethylformamide in water is 50 ($\pm$10) weight percent.

9. The process of claim 1 in which the anion-exchange resin is the strongly-basic type with quaternary ammonium functional groups.

10. The process of claim 1 in which the process involving the use of gold is a gold electroplating process.

11. The process of claim 1 in which the eluent is heated to a temperature range between 40 and 80 degrees C. in removing the gold cyanide ion from the anion-exchange resin and cooled to below 40 degrees C. to remove the gold cyanide ion from the eluent.

12. The process of claim 1 in which the gold is recovered from the eluent by electroplating.

13. The process of claim 1 in which the gold is recovered from the eluent by chemical reduction.

14. The process of claim 1 in which the thiocyanate ion is in the form of ammonium thiocyanate and the gold cyanide ion recovered is in the form of ammonium gold cyanide.

15. The process of claim 1 in which the aqueous solution is a gold plating bath.

* * * * *